Patented June 30, 1925.

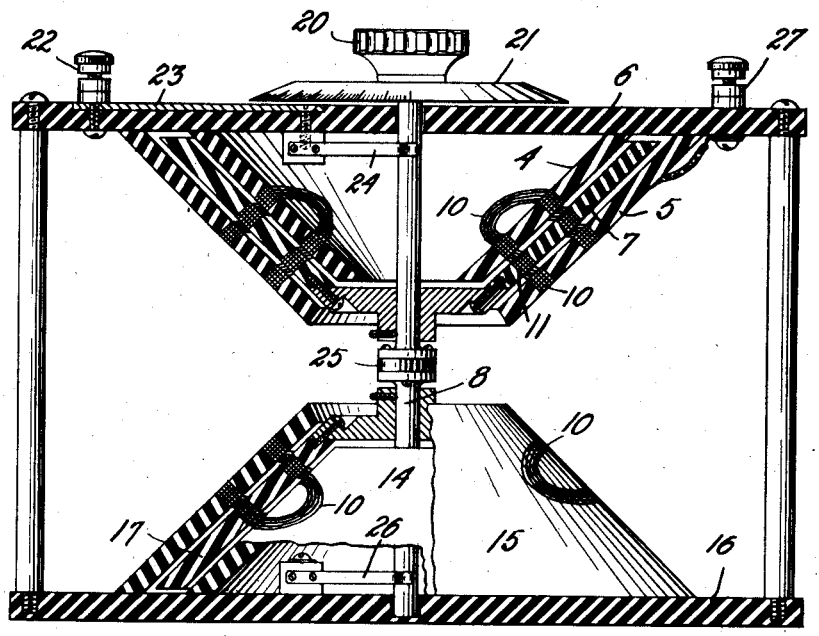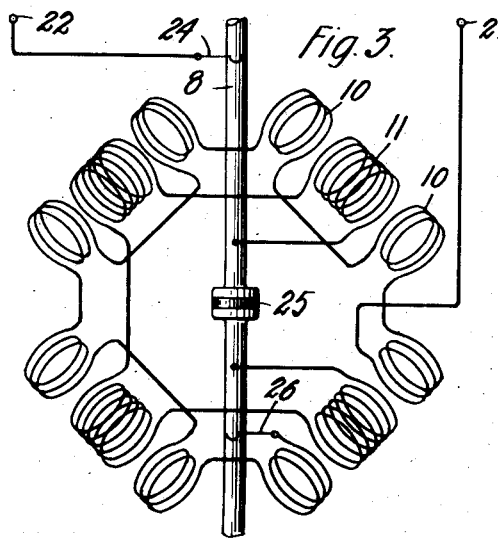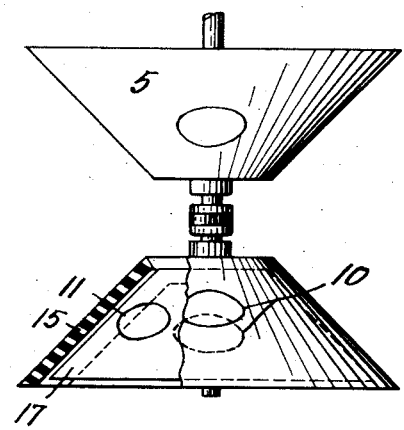

1,543,994

UNITED STATES PATENT OFFICE.

JOHN G. FERGUSON, OF BROOKLYN, NEW YORK, ASSIGNOR TO WESTERN ELECTRIC COMPANY, INCORPORATED, OF NEW YORK, N. Y., A CORPORATION OF NEW YORK.

INDUCTOMETER.

Application filed December 18, 1923. Serial No. 681,356.

*To all whom it may concern:*

Be it known that I, JOHN G. FERGUSON, a subject of the King of Great Britain, residing at Brooklyn, in the county of Kings and State of New York, have invented certain new and useful Improvements in Inductometers, of which the following is a full, clear, concise, and exact description.

This invention relates to inductometers, and its object is to provide an inductometer having a small stray field.

The inductometers in common use comprise two sets of coils. Inductometers of this nature are useful for many purposes, but they have a large stray field and are therefore unsatisfactory for use as apparatus, such as precision bridges, in which other electrical instruments are used. Either the apparatus must be made so large as to be unwieldy, or considerable difficulty will be found in the rigidness of certain of the instruments used therein.

In accordance with the general features of this invention, the number of sets of coils in the inductometer is increased by multiples of 2 and the size of the stray field correspondingly reduced. While any desired number of sets of coils which is divisible by 2 may be used, an inductometer consisting of four sets of coils arranged so as to approximate the form of a toroid has a sufficiently small stray field to be satisfactory in most cases.

The stationary coils in such an instrument may be held in place, and the movement of the movable coils controlled, by any convenient mechanism. The drawings show the stationary coils embedded in two oppositely mounted pairs of coaxial hollow truncated cones of insulating material and the movable coils embedded in two cones, each of which is mounted to rotate within one of said pairs of cones.

Fig. 1 is a side view of such an arrangement.

Fig. 2 is a view of a portion thereof when the movable coils are displaced.

Fig. 3 shows diagrammatically the manner in which the coils are electrically connected.

A pair of hollow, truncated, cones 4 and 5 are mounted one inside the other upon a mounting plate 6. These cones should preferably be rectangular,—that is, of such a nature that the apex of a bisected cone will be a right angle. A second pair of similar cones 14 and 15 are mounted oppositely to cones 4 and 5 upon a mounting plate 16 which is held to, and distanced from, plate 6 in any suitable manner. Within each pair of cones are placed one of two hollow cones 7 and 17, which are mounted on a metallic shaft 8 rotatably set in plates 6 and 16.

Each of the cones is formed of insulating material, preferably of a material such as vulcanizable rubber or a phenolic condensation product, which may be moulded from a flat piece and hardened by heat or by heat and pressure. Two coils preferably having an oval shape are embedded in each of the pieces of insulating material, from which the cones are formed and are so positioned therein that each pair of stationary cones will contain two sets of concentric coils 10 and that each of the movable cones will contain two coils 11 which will be concentric with the coils 10 of their respective sets when the movable cones are suitably adjusted. The centers of the cones in each set will thus be along one of the sides of a square (or of a parallelogram if the cones are not rectangular) one of whose axes corresponds to the axis of the cones.

The inductometer so formed is operated by the rotation of the shaft 8, which is provided for this purpose with a knob 20 and a calibrated scale 21.

Fig. 3 illustrates a method of electrically connecting the coils. The circuit extends from a terminal 22 in plate 6, along a conducting strip 23 and sliding contact 24, to the adjacent half of shaft 8 which is separated from the opposite half by an insulating joint 25. From here it passes through the four coils 11 in series, to the opposite half of shaft 8, sliding contact 26, through coils 10 in series, to a terminal 27 in plate 6.

It will thus be seen that the rotation of cones 7 and 17 containing coils 11 produces the same effect as the movement of the movable coils in an inductometer of the ordinary type.

The stray field of the inductometer illustrated will not extend appreciably outside the space between the plates 6 and 16, and therefore will not affect the other electrical instruments used in connection with the inductometer.

What is claimed is:

1. An inductometer comprising coaxial supports, means to produce relative rotational movement between said supports, and an even number of sets of coils positioned on said supports and arranged so as to approximate the form of a toroid.

2. An inductometer comprising coaxial truncated hollow cones, certain of said cones being movable and certain fixed, said movable cones being movable between said fixed cones, and sets of coils positioned in the surfaces of said cones, said coils being arranged so as to approximate the form of a toroid.

3. An inductometer comprising coaxial truncated cones, four pairs of fixed coils arranged in the surfaces of certain of said cones, the centers of said coils in each pair falling along one of the sides of a parallelogram and four movable coils arranged in the surfaces of others of said coaxial truncated cones, each of said movable coils being movable between the coils of two of said pairs.

4. In an inductometer, two oppositely mounted stationary pairs of coaxial, hollow truncated cones, a rotatable hollow cone within each of said pairs, two sets of concentric coils embedded in each pair of stationary cones, two coils so placed in each rotatable cone that they may be made concentric with the coils of said sets, and means to rotate the rotatable cones.

5. In an inductometer, two oppositely mounted stationary pairs of coaxial, hollow, truncated, rectangular cones, a rotatable metallic shaft, an insulating joint dividing the shaft, a hollow truncated cone within each of said pairs of stationary cones and mounted upon one of the divisions of said rotatable shaft, two sets of concentric coils embedded in each pair of stationary cones, two coils so placed in each rotatable cone that they may be made concentric with the coils of said sets, means to rotate the shaft, and an electrical circuit including all of said coils and the divisions of said shaft.

In witness whereof, I hereunto subscribe my name this 12 day of December A. D., 1923.

JOHN G. FERGUSON.